(12) United States Patent
Fujiwara et al.

(10) Patent No.: US 8,521,381 B2
(45) Date of Patent: Aug. 27, 2013

(54) POWER TRANSFER DEVICE AND CONTROL METHOD THEREOF, AND LOCK-UP CLUTCH DEVICE

(75) Inventors: Yasuhiro Fujiwara, Anjo (JP); Hiromasa Takai, Anjo (JP); Masatake Ichikawa, Anjo (JP); Yutaka Teraoka, Anjo (JP); Hiroshi Tsutsui, Nishio (JP)

(73) Assignee: Aisin AW Co., Ltd., Aichi-ken (JP)

( * ) Notice: Subject to any disclaimer, the term of this patent is extended or adjusted under 35 U.S.C. 154(b) by 315 days.

(21) Appl. No.: 12/973,004

(22) Filed: Dec. 20, 2010

(65) Prior Publication Data

US 2011/0246034 A1   Oct. 6, 2011

(30) Foreign Application Priority Data

Mar. 31, 2010   (JP) ................... 2010-081702

(51) Int. Cl.
  *G06F 19/00*   (2011.01)
(52) U.S. Cl.
  USPC ............................................. 701/58; 477/166
(58) Field of Classification Search
  USPC ............... 701/68, 51, 53, 58, 67; 477/166, 477/168, 176, 70, 77, 78, 79; 192/85.1
  See application file for complete search history.

(56) References Cited

U.S. PATENT DOCUMENTS 7,769,517 B2 * 8/2010 Segawa et al. .................. 701/68

FOREIGN PATENT DOCUMENTS

| JP | 2002-349693 A | 12/2002 |
|----|---------------|---------|
| JP | 2007-155047 A | 6/2007  |
| JP | 2009257403 A  | 11/2009 |

OTHER PUBLICATIONS

Search Report dated Mar. 16, 2011 in counterpart Application No. PCT/JP2011/053400.

* cited by examiner

*Primary Examiner* — Thomas Tarcza
*Assistant Examiner* — Adam Tissot
(74) *Attorney, Agent, or Firm* — Sughrue Mion, PLLC (57) ABSTRACT

A device with a stepped automatic transmission to transfer power from a power source to an axle using changeable shift speeds includes an input-side fluid transmission element connected to the power source, an output-side fluid transmission element connected to the transmission input shaft, a lock-up clutch engaging and disengaging the input-side and the output-side fluid transmission elements; a unit adjusting the lock-up clutch; a unit setting, when a downshift is to be performed in response to a predetermined request for a large drive force, a predetermined target slip speed value larger than a non-shifting-time value before a rotational speed of the power source exceeds a input shaft rotational speed after the downshift, and setting the target slip speed to decrease toward the non-shifting-time value along with lapse of time after the power source rotational speed source exceeds the post-shifting input shaft speed; and a unit controlling the engagement force so the slip speed becomes the set target slip speed. The target slip speed is a difference between the rotational speeds of the power source and the input shaft, and the non-shifting-time value is set when no shifting is performed.

5 Claims, 8 Drawing Sheets

|  |  | C-1 | C-2 | C-3 | B-1 | B-2 | F-1 |
|---|---|---|---|---|---|---|---|
|  | P |  |  |  |  |  |  |
|  | REV |  |  | ○ |  | ○ |  |
|  | N |  |  |  |  |  |  |
| D | 1st | ○ |  |  |  | ● | ○ |
|  | 2nd | ○ |  |  | ○ |  |  |
|  | 3rd | ○ |  | ○ |  |  |  |
|  | 4th | ○ | ○ |  |  |  |  |
|  | 5th |  | ○ | ○ |  |  |  |
|  | 6th |  | ○ |  | ○ |  |  |

○: ENGAGED,
●: ENGAGED WITH ENGINE BRAKE IN OPERATION

POWER TRANSFER DEVICE AND CONTROL METHOD THEREOF, AND LOCK-UP CLUTCH DEVICE

INCORPORATION BY REFERENCE

The disclosure of Japanese Patent Application No. 2010-081702 filed on Mar. 31, 2010 including the specification, drawings and abstract is incorporated herein by reference in its entirety.

BACKGROUND OF THE INVENTION

The present invention relates to a power transfer device and a control method thereof, and a lock-up clutch device, and in particular to a power transfer device including a stepped automatic transmission mounted on a vehicle to transfer power from a power source to an axle using changeable shift speeds and a control method thereof, and a lock-up clutch device including a lock-up clutch mounted on a vehicle to engage and disengage an input-side fluid transmission element connected to a power source and an output-side fluid transmission element connected to an input shaft of a stepped automatic transmission.

DESCRIPTION OF THE RELATED ART

In the related art, there has been proposed a power transfer device which includes a torque converter with a lock-up clutch connected to a crankshaft of an engine and a continuously variable transmission connected to an output side of the torque converter. In the power transfer device, when a downshift of the continuously variable transmission is to be performed along with depression of an accelerator pedal, the lock-up clutch engagement pressure is lowered to cause the torque converter to slip. After an engine speed Ne rises to a rotational speed (Nt*−α) which is lower than a rotational speed input to the transmission corresponding to the speed ratio after the shifting (hereinafter referred to as a post-shifting transmission input rotational speed) by a margin α, the lock-up clutch engagement pressure is feedback controlled such that the engine speed Ne becomes the post-shifting transmission input rotational speed Nt*. When a transmission input rotational speed Nt coincides with the post-shifting transmission input rotational speed Nt*, the lock-up clutch engagement pressure is maximized to accomplish lock-up (see Japanese Patent Application Publication No. JP-A-2002-349693, for example). By performing such control, the device prevents the engine speed Ne from rising to more than the post-shifting transmission input rotational speed Nt* and prevents the engine speed Ne from being lowered when the lock-up is accomplished, whereby the engine speed is prevented from being lowered even during acceleration due to depression of the accelerator pedal.

SUMMARY OF THE INVENTION

In the case where a stepped automatic transmission is used in place of the continuously variable transmission of the power transfer device discussed above, the engine speed Ne can be raised quickly by performing the same control as the control discussed above when a downshift of the automatic transmission is to be performed in response to depression of the accelerator pedal. In the case where it is necessary to raise the engine speed Ne relatively significantly such as in a downshift to a relatively low shift speed, however, the difference (Ne−Nt) between the engine speed Ne and the transmission input rotational speed Nt at the timing when the engine speed Ne reaches the rotational speed (Nt*−α) may be increased, and it may take a long time for the difference (Ne−Nt) to be reduced to a value when no shifting is performed (a value of 0 if lock-up is performed).

It is a main object of the power transfer device and the control method thereof, and the lock-up clutch device according to the present invention to quickly raise the rotational speed of a power source to the rotational speed of an input shaft of a stepped automatic transmission after a downshift and to reduce the time required for the difference between the rotational speed of the power source and the rotational speed of the input shaft of the automatic transmission to be increased temporarily and then reduced to a value when no shifting of the automatic transmission is performed, when a downshift of the automatic transmission is to be performed in response to a predetermined request for a large drive force.

In order to achieve the foregoing main object, the power transfer device and the control method thereof, and the lock-up clutch device according to the present invention adopt the following means.

The present invention provides a power transfer device including a stepped automatic transmission mounted on a vehicle to transfer power from a power source to an axle using changeable shift speeds, including: a fluid transmission apparatus including an input-side fluid transmission element connected to the power source, an output-side fluid transmission element connected to an input shaft of the automatic transmission, and a lock-up clutch that engages and disengages the input-side fluid transmission element and the output-side fluid transmission element; an engagement force adjustment unit that adjusts an engagement force of the lock-up clutch; a target slip speed setting unit that sets, when a downshift of the automatic transmission is to be performed in response to a predetermined request for a large drive force, a target slip speed to a predetermined value larger than a non-shifting-time value before a rotational speed of the power source exceeds a post-shifting input shaft speed which is a rotational speed of the input shaft after the downshift, and setting the target slip speed so as to decrease toward the non-shifting-time value along with lapse of time after the rotational speed of the power source exceeds the post-shifting input shaft speed, wherein the target slip speed is a target value of the slip speed which is the difference between the rotational speed of the power source and the rotational speed of the input shaft, and the non-shifting-time value is a value that is set when no shifting of the automatic transmission is performed; and a control unit that controls the engagement force adjustment unit such that the slip speed becomes the set target slip speed.

In the power transfer device according to the present invention, when a downshift of the stepped automatic transmission is to be performed in response to the predetermined request for a large drive force, the target slip speed is set to the predetermined value larger than the non-shifting-time value, and the engagement force adjustment unit is controlled such that the slip speed becomes the target slip speed before the rotational speed of the power source exceeds a post-shifting input shaft speed which is the rotational speed of the input shaft of the automatic transmission after the downshift. In the power transfer device, the target slip speed is a target value of the slip speed which is the difference between the rotational speed of the power source and the rotational speed of the input shaft, and the non-shifting-time value is a value that is set when no shifting of the automatic transmission is performed. Accordingly, the rotational speed of the power source can be quickly raised to the post-shifting input shaft speed while preventing the slip speed from becoming too high. Then, the target slip speed is set so as to decrease toward the non-shifting-time value along with lapse of time and the engagement force adjustment unit is controlled such that the slip speed becomes the target slip speed after the rotational speed of the power source exceeds the post-shifting input shaft speed. Because the slip speed is prevented from becoming too high as discussed earlier, the time required for the slip speed to decrease to the non-shifting-time value can be reduced. The "predetermined request for a large drive force" may mean at least one of an accelerator operation amount of a predetermined amount or more, a target torque, which is the target value of torque to be output from the power source set on the basis of the accelerator operation amount and the vehicle speed, of a predetermined torque or more, a throttle opening of a predetermined opening or more, and a torque to be output from the power source of a predetermined torque or more, or may mean an increase in at least one of the accelerator operation amount, the target torque, the throttle opening, and the output torque.

In the thus configured power transfer device according to the present invention, after the rotational speed of the power source exceeds the post-shifting input shaft speed, the target slip speed setting unit may set the target slip speed to a smaller one of the predetermined value and an input shaft speed difference, or and a value obtained by adding a second predetermined value smaller than the predetermined value to the input shaft speed difference before the rotational speed of the input shaft reaches the post-shifting input shaft speed. In the power transfer device, the input shaft speed difference is a difference between the rotational speed of the input shaft and the post-shifting input shaft speed. Further, the target slip speed setting unit may set the target slip speed so as to decrease at a predetermined change rate along with lapse of time after the rotational speed of the input shaft reaches the post-shifting input shaft speed. In this way, the target slip speed can be reduced in accordance with the difference between the rotational speed of the input shaft and the post-shifting input shaft speed after the rotational speed of the power source exceeds the post-shifting input shaft speed and before the rotational speed of the input shaft reaches the post-shifting input shaft speed.

In the power transfer device according to the present invention, in addition, the target slip speed setting unit may use a value of 0 as the non-shifting-time value after the downshift. In this case, the lock-up clutch couples (locks up) the input-side fluid transmission element and the output-side fluid transmission element when the target slip speed is approximated to a value of 0 to be set to a value of 0.

In the power transfer device according to the present invention, further, the non-shifting-time value may be set on the basis of the rotational speed of the input shaft and the output torque of the power source.

The present invention also provides a lock-up clutch device including a lock-up clutch mounted on a vehicle to engage and disengage an input-side fluid transmission element connected to a power source and an output-side fluid transmission element connected to an input shaft of a stepped automatic transmission, including: an engagement force adjustment unit that adjusts an engagement force of the lock-up clutch; a target slip speed setting unit that sets, when a downshift of the automatic transmission is to be performed in response to a predetermined request for a large drive force, a target slip speed to a predetermined value larger than a non-shifting-time value before a rotational speed of the power source exceeds a post-shifting input shaft speed which is a rotational speed of the input shaft after the downshift, and setting the target slip speed so as to decrease toward the non-shifting-time value along with lapse of time after the rotational speed of the power source exceeds the post-shifting input shaft speed, wherein the target slip speed is a target value of the slip speed which is the difference between the rotational speed of the power source and the rotational speed of the input shaft, and the non-shifting-time value is a value that is set when no shifting of the automatic transmission is performed; and a control unit that controls the engagement force adjustment unit such that the slip speed becomes the set target slip speed.

In the lock-up clutch device according to the present invention, when a downshift of the stepped automatic transmission is to be performed in response to the predetermined request for a large drive force, the target slip speed is set to the predetermined value larger than the non-shifting-time value, and the engagement force adjustment unit is controlled such that the slip speed becomes the target slip speed before the rotational speed of the power source exceeds the post-shifting input shaft speed which is the rotational speed of the input shaft of the automatic transmission after the downshift. In the lock-up clutch device, the target slip speed is a target value of the slip speed which is the difference between the rotational speed of the power source and the rotational speed of the input shaft, and the non-shifting-time value is a value that is set when no shifting of the automatic transmission is performed. Accordingly, the rotational speed of the power source can be quickly raised to the post-shifting input shaft speed while preventing the slip speed from becoming too high. Then, the target slip speed is set so as to decrease toward the non-shifting-time value along with lapse of time and the engagement force adjustment unit is controlled such that the slip speed becomes the target slip speed after the rotational speed of the power source exceeds the post-shifting input shaft speed. Because the slip speed is prevented from becoming too high as discussed earlier, the time required for the slip speed to decrease to the non-shifting-time value can be reduced. The "predetermined request for a large drive force" may mean at least one of the accelerator operation amount of a predetermined amount or more, the target torque, which is the target value of torque to be output from the power source set on the basis of the accelerator operation amount and the vehicle speed, of a predetermined torque or more, the throttle opening of a predetermined opening or more, and the torque to be output from the power source of a predetermined torque or more, or may mean an increase in at least one of the accelerator operation amount, the target torque, the throttle opening, and the output torque.

The present invention further provides a control method for a power transfer device including a stepped automatic transmission mounted on a vehicle to transfer power from a power source to an axle using changeable shift speeds, a fluid transmission apparatus including an input-side fluid transmission element connected to the power source, an output-side fluid transmission element connected to an input shaft of the automatic transmission, and a lock-up clutch that engages and disengages the input-side fluid transmission element and the output-side fluid transmission element, and an engagement force adjustment unit that adjusts an engagement force of the lock-up clutch. The method includes: setting, when a downshift of the automatic transmission is to be performed in response to a predetermined request for a large drive force, a target slip speed to a predetermined value larger than a non-shifting-time value and controlling the engagement force adjustment unit such that the slip speed becomes the set target slip speed before a rotational speed of the power source exceeds a post-shifting input shaft speed which is a rotational speed of the input shaft after the downshift, wherein the target slip speed is a target value of a slip speed which is a difference between the rotational speed of the power source and the rotational speed of the input shaft, and the non-shifting-time value is a value that is set when no shifting of the automatic transmission is performed; and setting the target slip speed so as to decrease toward the non-shifting-time value along with lapse of time and controlling the engagement force adjustment unit such that the slip speed becomes the set target slip speed after the rotational speed of the power source exceeds the post-shifting input shaft speed.

In the power transfer device control method according to the present invention, when a downshift of the stepped automatic transmission is to be performed in response to the predetermined request for a large drive force, the target slip speed is set to the predetermined value larger than the non-shifting-time value and the engagement force adjustment unit is controlled such that the slip speed becomes the target slip speed before the rotational speed of the power source exceeds the post-shifting input shaft speed which is the rotational speed of the input shaft of the automatic transmission after the downshift. In the power transfer control method, the target slip speed is a target value of the slip speed which is the difference between the rotational speed of the power source and the rotational speed of the input shaft, and the non-shifting-time value is a value that is set when no shifting of the automatic transmission is performed. Accordingly, the rotational speed of the power source can be quickly raised to the post-shifting input shaft speed while preventing the slip speed from becoming too high. Then, the target slip speed is set so as to decrease toward the non-shifting-time value along with lapse of time and the engagement force adjustment unit is controlled such that the slip speed becomes the target slip speed after the rotational speed of the power source exceeds the post-shifting input shaft speed. Because the slip speed is prevented from becoming too high as discussed earlier, the time required for the slip speed to decrease to the non-shifting-time value can be reduced. The "predetermined request for a large drive force" may mean at least one of the accelerator operation amount of a predetermined amount or more, the target torque, which is the target value of torque to be output from the power source set on the basis of the accelerator operation amount and the vehicle speed, of a predetermined torque or more, the throttle opening of a predetermined opening or more, and the torque to be output from the power source of a predetermined torque or more, or may mean an increase in at least one of the accelerator operation amount, the target torque, the throttle opening, and the output torque.

DETAILED DESCRIPTION OF THE EMBODIMENT

An embodiment of the present invention will be described below.

Figure 1:
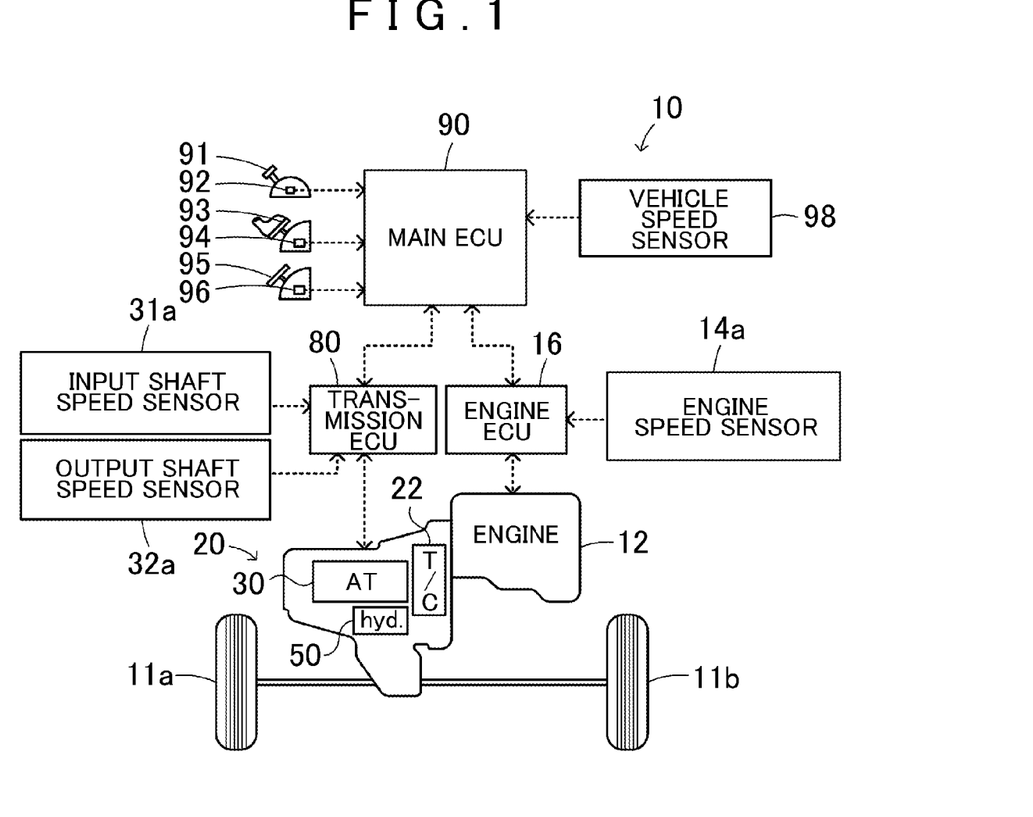
FIG. 1 is a diagram showing a schematic configuration of an automobile 10 on which a power transfer device 20 according to an embodiment of the present invention is mounted.
Figure 2:
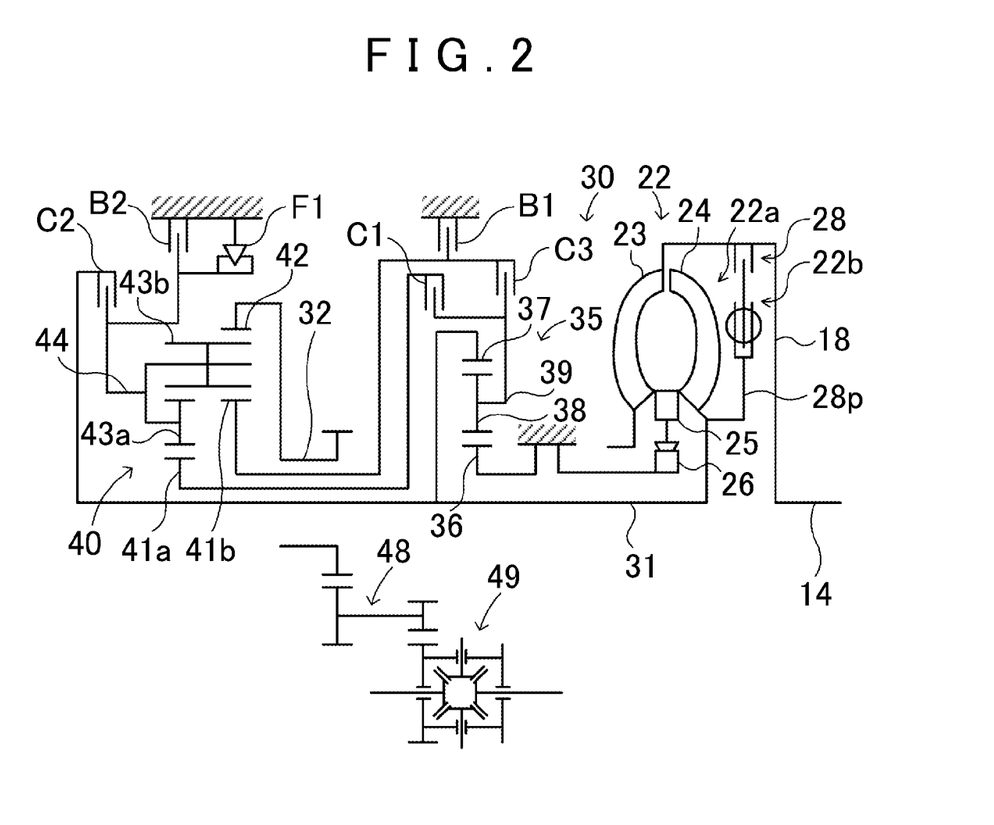
FIG. 2 is a diagram showing a schematic configuration of the power transfer device 20.

FIG. 1 is a diagram showing a schematic configuration of an automobile 10 on which a power transfer device 20 according to an embodiment of the present invention is mounted. FIG. 2 is a diagram showing a schematic configuration of the power transfer device 20. As shown in FIGS. 1 and 2, the automobile 10 according to the embodiment includes: an engine 12 which is an internal combustion engine that outputs power generated by explosive combustion of a hydrocarbon fuel such as gasoline and light oil; an engine electronic control unit (hereinafter referred to as an engine ECU) 16 that controls operation of the engine 12; a fluid transmission apparatus 22 attached to a crankshaft 14 of the engine 12; a stepped automatic transmission 30 including an input shaft 31 connected to the output side of the fluid transmission apparatus 22 and an output shaft 32 connected to drive wheels 11a and 11b via a gear mechanism 48 and a differential gear 49 to change the speed of power input to the input shaft 31 and output the power to the output shaft 32 at the changed speed; a hydraulic circuit 50 that supplies hydraulic oil to the fluid transmission apparatus 22 and the automatic transmission 30; a transmission electronic control unit (hereinafter referred to as a transmission ECU) 80 that controls the fluid transmission apparatus 22 and the automatic transmission 30 by controlling the hydraulic circuit 50, and a main electronic control unit (hereinafter referred to as a main ECU) 90 that controls the entire vehicle. The fluid transmission apparatus 22, the automatic transmission 30, the hydraulic circuit 50, and the transmission ECU 80 correspond to the power transfer device 20 according to the embodiment.

The engine ECU 16 is formed as a microprocessor including a CPU as its main component, and includes a ROM that stores a processing program, a RAM that temporarily stores data, input and output ports, and a communication port in addition to the CPU. Signals from various sensors that detect the operating state of the engine 12, such as an engine speed Ne from a rotational speed sensor 14a attached to the crankshaft 14, are input to the engine ECU 16 via the input port. A drive signal for a throttle motor that adjusts the throttle opening, a control signal for a fuel injection valve, an ignition signal for an ignition plug, and so forth are output from the engine ECU 16 via the output port. The engine ECU 16 communicates with the main ECU 90, and controls the engine 12 in accordance with a control signal from the main ECU 90 and outputs data on the operating state of the engine 12 to the main ECU 90 as necessary.

As shown in FIG. 2, the fluid transmission apparatus 22 is formed as a fluid pressure torque converter with a lock-up clutch, and includes a pump impeller 23 serving as an input-side fluid transmission element connected to the crankshaft 14 of the engine 12 via a front cover 18, a turbine runner 24 serving as an output-side fluid transmission element connected to the input shaft 31 of the automatic transmission 30 via a turbine hub, a stator 25 disposed inside the pump impeller 23 and the turbine runner 24 to rectify the flow of hydraulic oil from the turbine runner 24 to the pump impeller 23, a one-way clutch 26 that restricts rotation of the stator 25 to one direction, and a lock-up clutch 28 having a damper mechanism. The fluid transmission apparatus 22 functions as a torque amplifier through the action of the stator 25 when the difference between the respective rotational speeds of the pump impeller 23 and the turbine runner 24 is large, and functions as a fluid coupling when the difference between the respective rotational speeds of the pump impeller 23 and the turbine runner 24 is small. The lock-up clutch 28 can establish and release lock-up in which the pump impeller 23 (front cover 18) and the turbine runner 24 (turbine hub) are coupled to each other. When lock-up on conditions are satisfied after the automobile 10 starts moving, the lock-up clutch 28 establishes lock-up between the pump impeller 23 and the turbine runner 24 so that power from the engine 12 is mechanically and directly transferred to the input shaft 31. In this event, variations in torque to be transferred to the input shaft 31 are absorbed by the damper mechanism.

The lock-up clutch 28 is configured to establish and release lock-up by varying the pressure in a lock-up off chamber 22b opposing, via a lock-up piston 28p, a fluid transmission chamber 22a in which the pump impeller 23 and the turbine runner 24 of the fluid transmission apparatus 22 are disposed. That is, when the pressure in the lock-up off chamber 22b is higher than the pressure in the fluid transmission chamber 22a, and when the pressure in the fluid transmission chamber 22a and the pressure in the lock-up off chamber 22b are equal to each other, the lock-up piston 28p does not move to the engagement side so that lock-up is not established (lock-up is released). When a pressure lower than the pressure in the fluid transmission chamber 22a is supplied to the inside of the lock-up off chamber 22b to lower the pressure in the lock-up off chamber 22b, on the other hand, the lock-up piston 28p moves to the front cover 18 side to bring a friction member into pressure contact with an inner surface of the front cover 18 so that lock-up is established (completed).

Figure 3:
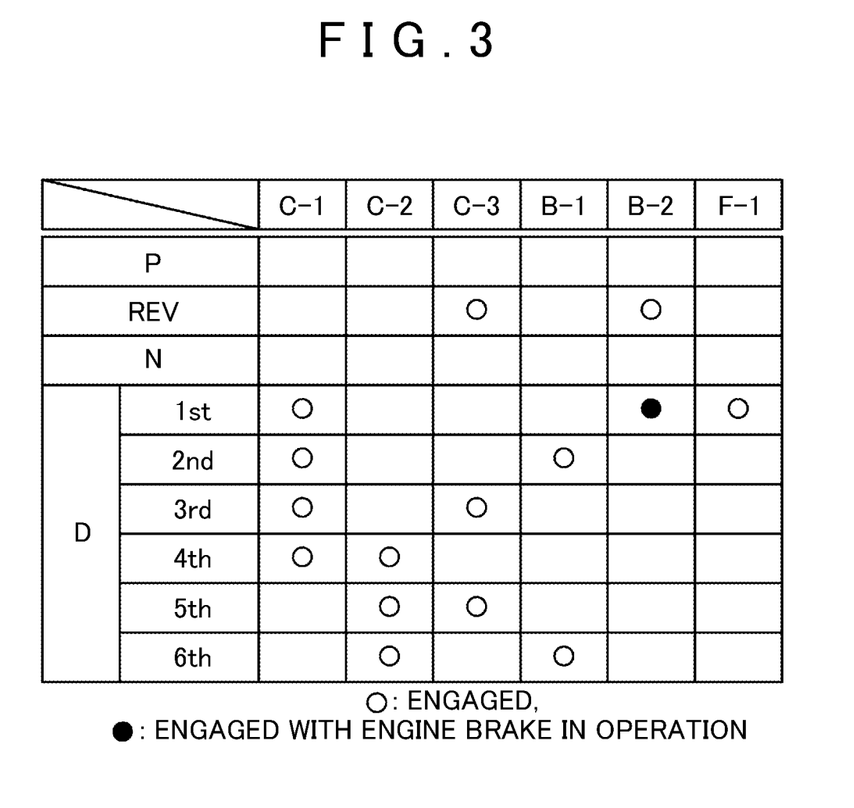
FIG. 3 shows an exemplary operation table of a stepped automatic transmission 30.

The automatic transmission 30 is formed as a six-speed stepped transmission, and includes a single-pinion type planetary gear mechanism 35, a Ravigneaux type planetary gear mechanism 40, three clutches C1, C2, and C3, two brakes B1 and B2, and a one-way clutch F1. The single-pinion type planetary gear mechanism 35 includes a sun gear 36 which is an external gear, a ring gear 37 which is an internal gear disposed concentrically with the sun gear 36, a plurality of pinion gears 38 meshed with the sun gear 36 and meshed with the ring gear 37, and a carrier 39 that holds the plurality of pinion gears 38 rotatably and revolvably. The sun gear 36 is fixed to a case. The ring gear 37 is connected to the input shaft 31. The Ravigneaux type planetary gear mechanism 40 includes: two sun gears 41a and 41b which are each an external gear; a ring gear 42 which is an internal gear; a plurality of short pinion gears 43a meshed with the sun gear 41a; a plurality of long pinion gears 43b meshed with the sun gear 41b and the plurality of short pinion gears 43a and meshed with the ring gear 42; and a carrier 44 that couples the plurality of short pinion gears 43a and the plurality of long pinion gears 43b to each other and that holds the gears 43a and the gears 43b rotatably and revolvably. The sun gear 41a is connected to the carrier 39 of the single-pinion type planetary gear mechanism 35 via the clutch C1. The sun gear 41b is connected to the carrier 39 via the clutch C3, and connected to the case via the brake B1. The ring gear 42 is connected to the output shaft 32. The carrier 44 is connected to the input shaft 31 via the clutch C2. The carrier 44 is also connected to the case via the brake B2, and connected to the case via the one-way clutch F1. As shown in the operation table of FIG. 3, the automatic transmission 30 can switchably establish first to sixth forward speeds, a reverse speed, and a neutral by turning on and off the clutches C1 to C3 (the on state corresponds to the engaged state, and the off state corresponds to the disengaged state) and turning on and off the brakes B1 and B2 in various combinations.

The fluid transmission apparatus 22 and the automatic transmission 30 are actuated by the hydraulic circuit 50 driven by the transmission ECU 80. The hydraulic circuit 50 includes: an oil pump that pumps hydraulic oil using power from the engine 12; a primary regulator valve that regulates the hydraulic oil from the oil pump to generate a line pressure PL; a secondary regulator valve that reduces the line pressure PL from the primary regulator valve to generate a secondary pressure Psec; a modulator valve that regulates the line pressure PL from the primary regulator valve to generate a constant modulator pressure Pmod; a manual valve that switches which (of the clutches C1 to C3 and the brakes B1 and B2) the line pressure PL from the primary regulator valve is supplied to in accordance with the operation position of a shift lever 91; and a plurality of linear solenoid valves that regulate the line pressure PL from the manual valve to generate a solenoid pressure for a corresponding one of the clutches C1 to C3 and the brakes B1 and B2, none of which is shown.

Figure 4:
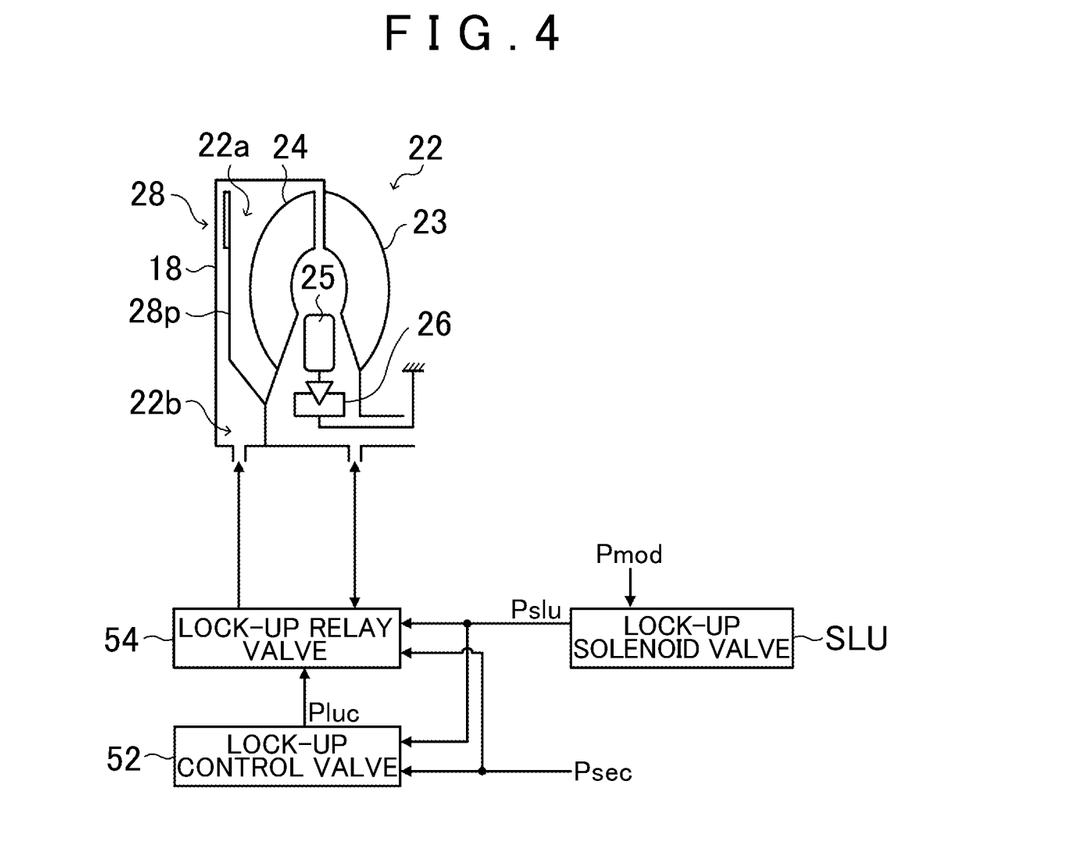
FIG. 4 is a diagram showing a schematic configuration of a lock-up clutch hydraulic system in a hydraulic circuit 50.

In order to actuate the lock-up clutch 28 of the fluid transmission apparatus 22, the hydraulic circuit 50 includes, as shown in FIG. 4, a lock-up solenoid valve SLU that regulates the modulator pressure Pmod from the modulator valve to generate a lock-up solenoid pressure Pslu, a lock-up control valve 52 that generates a lock-up clutch pressure Pluc for the lock-up clutch 28 corresponding to the lock-up solenoid pressure Pslu from the lock-up solenoid valve SLU, and a lock-up relay valve 54 that allows and restricts supply of the lock-up clutch pressure Pluc from the lock-up control valve 52 to the lock-up off chamber 22b of the fluid transmission apparatus 22. A portion of the hydraulic circuit 50 that is relevant to the actuation of the lock-up clutch 28 will hereinafter be referred to as a lock-up clutch hydraulic system.

The lock-up solenoid valve SLU regulates the modulator pressure Pmod from the modulator valve in accordance with the value of a current applied from an auxiliary battery (not shown) to generate the lock-up solenoid pressure Pslu, and is controlled by the transmission ECU 80. The lock-up control valve 52 is a spool valve that regulates the secondary pressure Psec from the secondary regulator valve in accordance with the lock-up solenoid pressure Pslu supplied from the lock-up solenoid valve SLU as a signal pressure to generate the lock-up clutch pressure Pluc for the lock-up clutch 28. In the embodiment, the lock-up control valve 52 generates the lock-up clutch pressure Pluc by reducing the secondary pressure Psec as the source pressure to a greater degree as the lock-up solenoid pressure Pslu from the lock-up solenoid valve SLU is higher, and outputs the lock-up clutch pressure Pluc required for complete engagement of the lock-up clutch 28 when the lock-up solenoid pressure Pslu is equal to or more than a lock-up engagement pressure P1. The lock-up relay valve 54 is a spool valve to which the lock-up solenoid pressure Pslu supplied from the lock-up solenoid valve SLU is input as a signal pressure. In the embodiment, the lock-up relay valve 54 is configured to supply the secondary pressure Psec from the secondary regulator valve to the lock-up off chamber 22b, and to supply the secondary pressure Psec from the secondary regulator valve to the fluid transmission chamber 22a and to supply the lock-up clutch pressure Pluc from the lock-up control valve 52 to the lock-up off chamber 22b, when the lock-up solenoid pressure Pslu is supplied from the lock-up solenoid valve SLU.

In the thus configured lock-up clutch hydraulic system, when the lock-up solenoid valve SLU does not generate the lock-up solenoid pressure Pslu, hydraulic oil (at the secondary pressure Psec) is supplied from the lock-up relay valve 54 to the lock-up off chamber 22b, and flows from the lock-up off chamber 22b into the fluid transmission chamber 22a to equalize the respective pressures in the lock-up off chamber 22b and the fluid transmission chamber 22a so that lock-up is not established (lock-up is released). Part of the hydraulic oil which has flowed from the lock-up off chamber 22b into the fluid transmission chamber 22a flows out to the lock-up relay valve 54 side via hydraulic oil outlet and inlet ports. When the lock-up solenoid pressure Pslu generated by the lock-up solenoid valve SLU is supplied to the lock-up control valve 52 and the lock-up relay valve 54, on the other hand, the lock-up clutch pressure Pluc (which is lower than the secondary pressure Psec) generated by the lock-up control valve 52 is supplied from the lock-up relay valve 54 to the lock-up off chamber 22b, and the secondary pressure Psec from the secondary regulator valve is supplied from the lock-up relay valve 54 to the inside of the fluid transmission chamber 22a. As the pressure in the lock-up off chamber 22b is lowered, the lock-up piston 28p moves to the engagement side. When the lock-up solenoid pressure Pslu reaches the lock-up engagement pressure P1 or more, the lock-up clutch 28 is completely engaged to complete lock-up.

The transmission ECU 80 is formed as a microprocessor including a CPU as its main component, and includes a ROM that stores a processing program, a RAM that temporarily stores data, input and output ports, and a communication port in addition to the CPU. An input shaft speed Nin from a rotational speed sensor 31a attached to the input shaft 31, an output shaft speed Nout from a rotational speed sensor 32a attached to the output shaft 32, and so forth are input to the transmission ECU 80 via the input port. A control signal for the hydraulic circuit 50 and so forth are output from the transmission ECU 80 via the output port. The transmission ECU 80 communicates with the main ECU 90, and controls the fluid transmission apparatus 22 and the automatic transmission 30 (hydraulic circuit 50) in accordance with a control signal from the main ECU 90 and outputs data on the respective states of the fluid transmission apparatus 22 and the automatic transmission 30 to the main ECU 90 as necessary.

The main ECU 90 is formed as a microprocessor including a CPU as its main component, and includes a ROM that stores a processing program, a RAM that temporarily stores data, input and output ports, and a communication port in addition to the CPU. A shift position SP from a shift position sensor 92 that detects the operation position of the shift lever 91, an accelerator operation amount Acc from an accelerator pedal position sensor 94 that detects the depression amount of an accelerator pedal 93, a brake switch signal BSW from a brake switch 96 that detects depression of a brake pedal 95, a vehicle speed V from a vehicle speed sensor 98, and so forth are input to the main ECU 90 via the input port. As discussed earlier, the main ECU 90 is connected to the engine ECU 16 and the transmission ECU 80 via the communication port to exchange various control signals and data with the engine ECU 16 and the transmission ECU 80.

Figure 5:
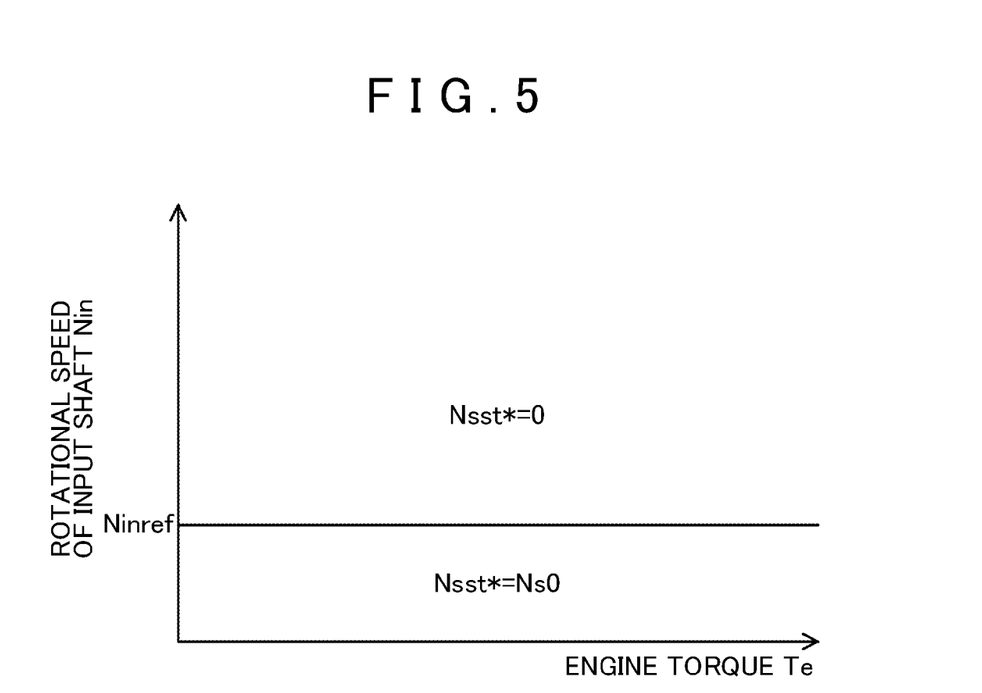
FIG. 5 shows an exemplary non-shifting-time target slip speed setting map.

In the power transfer device 20 according to the embodiment provided in the automobile 10 configured as described above, when shifting of the automatic transmission 30 is not performed, a target slip speed Ns* is set on the basis of an output torque Te of the engine 12 estimated from the operating state of the engine 12 (such as the engine speed Ne and the intake air amount) and the input shaft speed Nin, the target slip speed Ns* being the target value of a slip speed Ns which is the difference between the rotational speed of the engine 12 and the rotational speed of the input shaft 31, and the lock-up clutch hydraulic system (in the embodiment, the lock-up solenoid valve SLU) of the hydraulic circuit 50 is controlled such that the lock-up clutch 28 is engaged with an engagement force with which the slip speed Ns becomes the target slip speed Ns*. In the embodiment, the target slip speed Ns* set at this time (hereinafter referred to as a non-shifting-time target slip speed Nsst*) is set by determining the relationship between the input shaft speed Nin, the output torque Te of the engine 12, and the non-shifting-time target slip speed Nsst* in advance to store the determined relationship in a ROM (not shown) as a non-shifting-time target slip speed setting map, and deriving the non-shifting-time target slip speed Nsst* corresponding to the input shaft speed Nin and the output torque Te of the engine 12 which are given using the stored map. An exemplary non-shifting-time target slip speed setting map is shown in FIG. 5. In the example of FIG. 5, the non-shifting-time target slip speed Nsst* is set to a predetermined value Ns0 (such as 30 rpm or 50 rpm, for example) in a region where the input shaft speed Nin is less than a predetermined value Ninref (such as 1200 rpm or 1500 rpm, for example), and set to a value of 0 in a region where the input shaft speed Nin is not less than the predetermined value Ninref. When the non-shifting-time target slip speed Nsst* is set to a value of 0 in this process, the lock-up clutch 28 is engaged, that is, lock-up is performed, with an engagement force with which the slip speed Ns (=Ne−Nin) becomes a value of 0.

Figure 6:
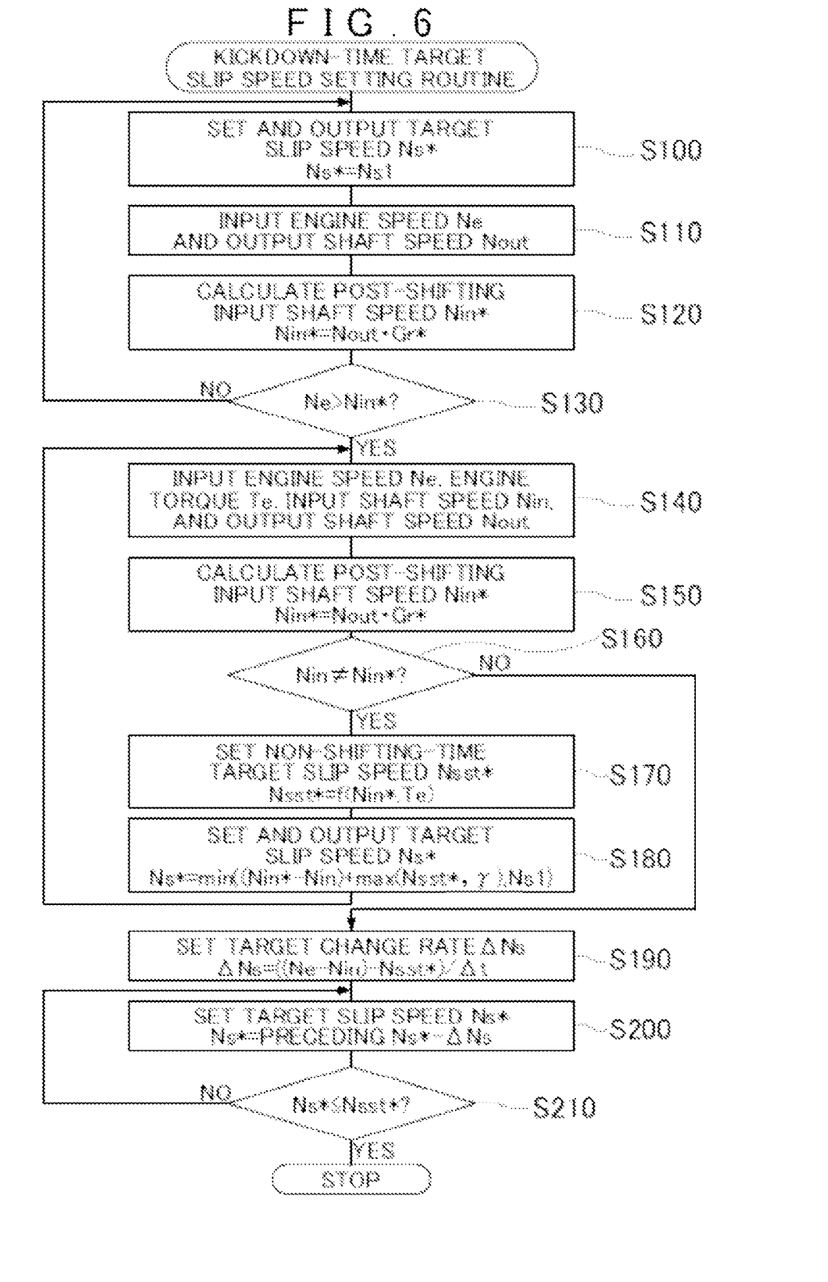
FIG. 6 is a flowchart showing an exemplary kickdown-time target slip speed setting routine executed by a transmission ECU 80.
Figure 7:
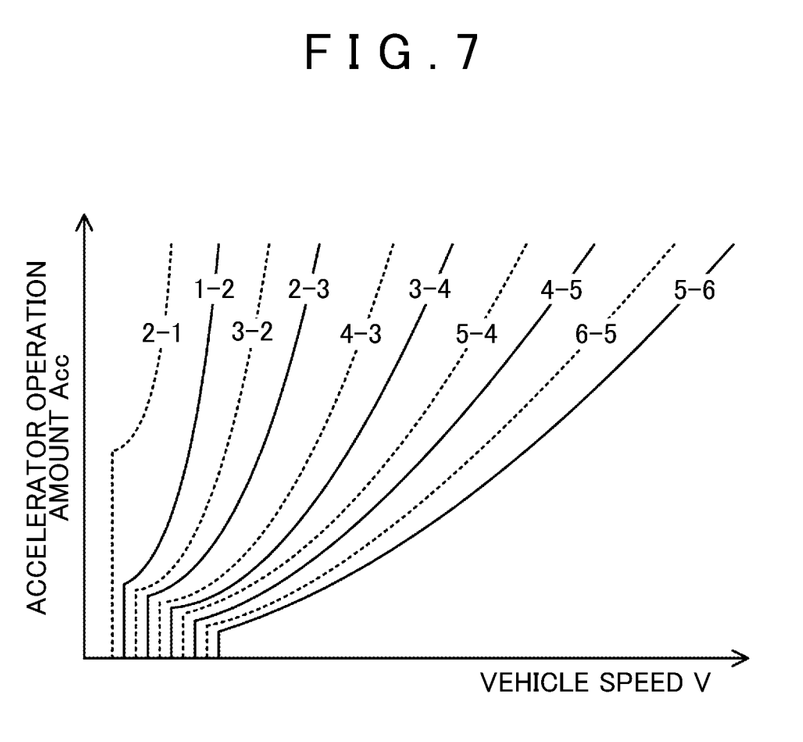
FIG. 7 shows an exemplary speed change map.

Next, operation of the thus configured power transfer device 20 according to the embodiment, specifically a process for setting the target slip speed Ns* when a downshift of the automatic transmission 30 is to be performed in response to a driver depressing the accelerator pedal 93, or at the time of a so-called kickdown, will be described. FIG. 6 is a flowchart showing an exemplary kickdown-time target slip speed setting routine executed by the transmission ECU 80. The routine is executed when kickdown conditions are satisfied. The kickdown conditions may be satisfied when a downshift of the automatic transmission 30 is to be performed with the accelerator operation amount Acc, or the target torque Te* to be output from the engine 12, the throttle opening TH of the engine 12, the output torque Te from the engine 12, or the like which is set on the basis of the accelerator operation amount Acc, being a predetermined value or more, or when a downshift of the automatic transmission 30 is to be performed in response to an increase in accelerator operation amount Acc, target torque Te*, throttle opening TH, output torque Te from the engine 12, or the like. For reference, an exemplary speed change map for the automatic transmission 30 based on the accelerator operation amount Acc and the vehicle speed V is shown in FIG. 7. In the example of FIG. 7, it can be determined that the kickdown conditions are satisfied when a downshift line is crossed in response to an increase in accelerator operation amount Acc. In the embodiment, the kickdown conditions are defined to be satisfied in a vehicle speed range in which the rotational speed of the input shaft 31 after a downshift of the automatic transmission 30 (a post-shifting input shaft speed Nin* to be discussed later) is assumed to become the predetermined value Ninref or more. When the routine is executed, the transmission ECU 80 performs a downshift of the automatic transmission 30 along with execution of the routine.

When the kickdown-time target slip speed setting routine is executed, the CPU of the transmission ECU 80 first sets the target slip speed Ns* to a predetermined value Ns1 to output the set target slip speed Ns* (step S100). The predetermined value Ns1 may be a value that is sufficiently large compared to the non-shifting-time target slip speed Nsst* discussed earlier, and may be 300 rpm, 400 rpm, or 500 rpm, for example. When the target slip speed Ns* is thus output by the routine, the transmission ECU 80 controls the lock-up clutch hydraulic system (in the embodiment, the lock-up solenoid valve SLU) of the hydraulic circuit 50 such that the slip speed Ns (Ne−Nin) becomes the target slip speed Ns*. Accordingly, the engagement force exerted by the lock-up clutch 28 is adjusted to an engagement force with which the slip speed Ns becomes the target slip speed Ns*.

Subsequently, the engine speed Ne, which is detected by the rotational speed sensor 14a and input through communication from the engine ECU 16 via the main ECU 90, and the output shaft speed Nout from the rotational speed sensor 32a are input (step S110). The input output shaft speed Nout is multiplied by the speed change ratio of a shift speed after the downshift of the automatic transmission 30 to calculate the post-shifting input shaft speed Nin*, which is the rotational speed of the input shaft 31 after a downshift of the automatic transmission 30 (hereinafter referred to as a post-shifting speed ratio) Gr* (step S120). The engine speed Ne is compared with the post-shifting input shaft speed Nin* (step S130). If the engine speed Ne is not more than the post-shifting input shaft speed Nin*, the process returns to step S100, and waits for the engine speed Ne to exceed the post-shifting input shaft speed Nin*. That is, if the engine speed Ne is not more than the post-shifting input shaft speed Nin*, the engagement force exerted by the lock-up clutch 28 is held at an engagement force with which the slip speed Ns becomes the target slip speed Ns*. In this case, the engine speed Ne rises quickly compared to the input shaft speed Nin (the slip speed Ns becomes higher) when the slip speed Ns is less than the target slip speed Ns*, and the engine speed Ne and the input shaft speed Nin rise in similar ways (the engine speed Ne rises in accordance with a rise in input shaft speed Nin due to the downshift of the automatic transmission 30) when the slip speed Ns is generally equal to the target slip speed Ns*.

Then, when the engine speed Ne exceeds the post-shifting input shaft speed Nin*, the engine speed Ne, the output torque Te of the engine 12, the output shaft speed Nout, and the input shaft speed Nin from the rotational speed sensor 31a are input (step S140). The input output shaft speed Nout is multiplied by the post-shifting speed ratio Gr* to calculate the post-shifting input shaft speed Nin* (step S150). The post-shifting input shaft speed Nin* is compared with the input shaft speed Nin (step S160). In the process of step S160, it is determined whether or not the input shaft speed Nin has reached the post-shifting input shaft speed Nin*.

If the post-shifting input shaft speed Nin* is different from the input shaft speed Nin, it is determined that the input shaft speed Nin has not reached the post-shifting input shaft speed Nin*, and the non-shifting-time target slip speed Nsst* is set on the basis of the post-shifting input shaft speed Nin* and the output torque Te (step S170). The target slip speed Ns* is set by limiting with the predetermined value Ns1 a value obtained by adding the larger one of the non-shifting-time target slip speed Nsst* and a predetermined value γ (such as 20 rpm, 30 rpm, or 40 rpm, for example) to the difference (Nin*−Nin) between the post-shifting input shaft speed Nin* and the input shaft speed Nin as indicated by the following formula (1) to output the set target slip speed Ns* (step S180). The process then returns to step S140. The non-shifting-time target slip speed Nsst* is set by applying the post-shifting input shaft speed Nin* and the output torque Te to a map obtained by replacing the "input shaft speed Nin" in the non-shifting-time target slip speed setting map of FIG. 5 discussed earlier with the "post-shifting input shaft speed Nin*". In the embodiment, because the kickdown conditions are satisfied in a vehicle speed range in which the post-shifting input shaft speed Nin* is assumed to become the predetermined value Ninref or more as discussed earlier, the non-shifting-time target slip speed Nsst* is set to a value of 0. In the process of step S180, the target slip speed Ns* is set by limiting with the predetermined value Ns1 a value obtained by adding the larger one of the non-shifting-time target slip speed Nsst* and the predetermined value γ to the difference (Nin*−Nin) for the purpose of making the engine speed Ne higher than the post-shifting input shaft speed Nin* so as not give the driver a sense of sluggishness.

$$Ns^* = \min((Nin^* - Nin) + \max(Nsst^*, \gamma), Ns1) \quad (1)$$

When the post-shifting input shaft speed Nin* becomes equal to the input shaft speed Nin while the processes of steps S140 to S180 are repeatedly executed as described above, it is determined that the input shaft speed Nin has reached the post-shifting input shaft speed Nin*, and a target change rate ΔNs as a rate at which the target slip speed Ns* is gradually reduced is calculated by subtracting the non-shifting-time target slip speed Nsst* (in the embodiment, a value of 0) from the slip speed Ns, which is obtained by subtracting the input shaft speed Nin from the engine speed Ne, and dividing the obtained value by a predetermined value Δt as indicated by the following formula (2) (step S190). The target slip speed Ns* is set by subtracting the calculated target change rate ΔNs from the preceding target slip speed (preceding Ns*) as indicated by the formula (3) to output the set target slip speed Ns* (step S200). The target slip speed Ns* is compared with the non-shifting-time target slip speed Nsst* (step S210). If the target slip speed Ns* is larger than the non-shifting-time target slip speed Nsst*, the process returns to step S200. The predetermined value Δt may be a value determined on the basis of the shift speed after the downshift of the automatic transmission 30 (post-shifting speed ratio Gr*), the output torque Te of the engine 12, or the like, or may be a fixed value. By adjusting the engagement force of the lock-up clutch 28 using the thus set target slip speed Ns*, the target slip speed Ns* gradually approximates the non-shifting-time target slip speed Nsst*. If the target slip speed Ns* becomes the non-shifting-time target slip speed Nsst* or less (step S210), the routine is terminated. In the embodiment, because the target slip speed Nsst* is set to a value of 0, the lock-up clutch 28 performs lock-up when the target slip speed Ns* is set to a value of 0. Because the target slip speed Ns* is set to the predetermined value Ns1 before the engine speed Ne exceeds the post-shifting input shaft speed Nin* as discussed earlier, the slip speed Ns (=Ne−Nin) at the timing when the engine speed Ne exceeds the post-shifting input shaft speed Nin* can be prevented from becoming too high. As a result, the time since the engine speed Ne exceeds the post-shifting input shaft speed Nin* until the slip speed Ns approximates the non-shifting-time target slip speed Nsst* can be reduced.

$$\Delta Ns = ((Ne - Nin) - Nsst^*)/\Delta t \quad (2)$$

$$Ns^* = \text{preceding } Ns^* - \Delta Ns \quad (3)$$

Figure 8:
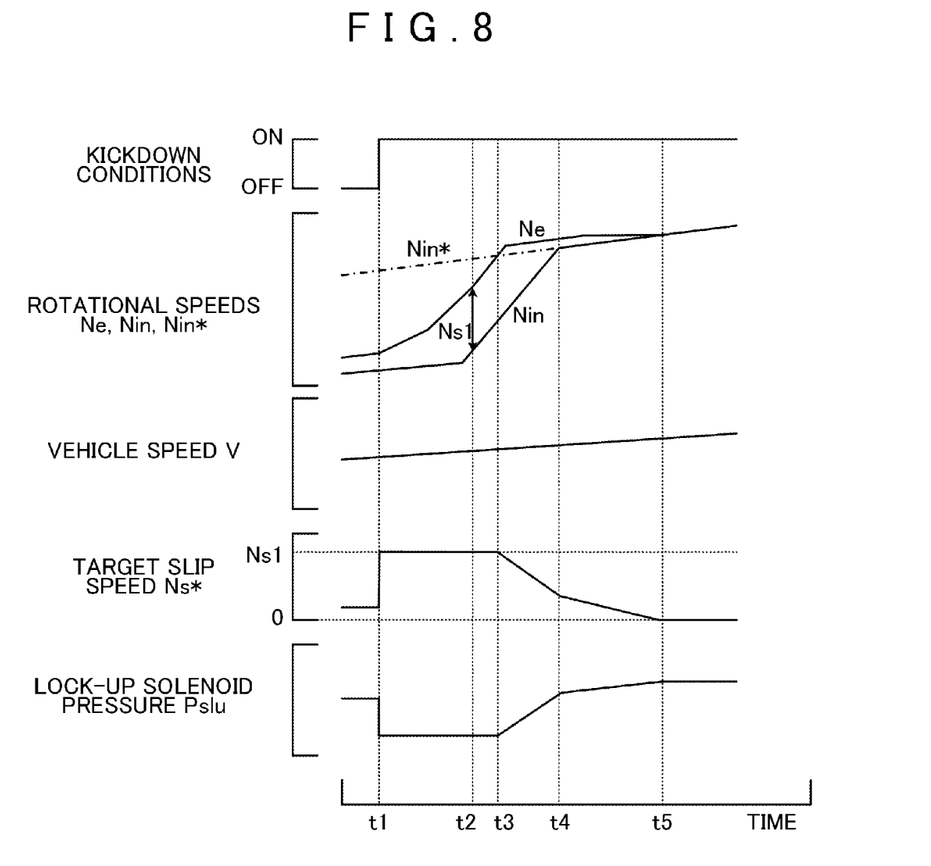
FIG. 8 shows exemplary temporal changes in engine speed Ne, input shaft speed Nin, post-shifting input shaft speed Nin*, vehicle speed V, target slip speed Ns*, and lock-up solenoid pressure Pslu from a lock-up solenoid valve SLU at the time of a kickdown.

FIG. 8 shows exemplary temporal changes in engine speed Ne, input shaft speed Nin, post-shifting input shaft speed Nin*, vehicle speed V, target slip speed Ns*, and lock-up solenoid pressure Pslu from the lock-up solenoid valve SLU at the time of a kickdown. As shown in the drawing, when the kickdown conditions are satisfied (time t1), the target slip speed Ns* is set to the predetermined value Ns1, and the lock-up solenoid pressure Pslu corresponding to the set target slip speed Ns* is generated. Thus, the engagement force of the lock-up clutch 28 is reduced, and the engine speed Ne rises quickly. At this time, however, the target slip speed Ns* is held at the predetermined value Ns1. Thus, when the slip speed Ns (Ne−Nin) is increased to the target slip speed Ns* (time t2), the engine speed Ne and the input shaft speed Nin rise in similar ways (the engine speed Ne rises in accordance with a rise in input shaft speed Nin due to the downshift of the automatic transmission 30). Thus, the slip speed Ns can be prevented from becoming too high. Then, after the engine speed Ne exceeds the post-shifting input shaft speed Nin* (time t3), the target slip speed Ns* is set by limiting with the predetermined value Ns1 a value obtained by adding the larger one of the non-shifting-time target slip speed Nsst* and the predetermined value γ to the difference (Nin*−Nin) between the post-shifting input shaft speed Nin* and the input shaft speed Nin, and the lock-up solenoid pressure Pslu corresponding to the set target slip speed Ns* is generated. After the input shaft speed Nin reaches the post-shifting input shaft speed Nin* (time t4), the target slip speed Ns* is reduced at the target change rate ΔNs, and the lock-up solenoid pressure Pslu corresponding to the reduced target slip speed Ns* is generated. When the target slip speed Ns* becomes the non-shifting-time target slip speed Nsst* or less (time t5), that is, when the target slip speed Ns* becomes a value of 0 in the embodiment, the lock-up clutch 28 completes lock-up.

According to the power transfer device 20 of the embodiment described above, at the time of a kickdown when a downshift of the stepped automatic transmission 30 is performed in response to the driver depressing the accelerator pedal 93, the target slip speed Ns* is set to the predetermined value Ns1 and the lock-up clutch hydraulic system of the hydraulic circuit 50 is controlled using the set target slip speed Ns* before the engine speed Ne exceeds the post-shifting input shaft speed Nin* which is the rotational speed of the input shaft 31 after the downshift of the automatic transmission 30. In addition, the target slip speed Ns* is set so as to decrease toward the non-shifting-time target slip speed Nsst* along with lapse of time and the lock-up clutch hydraulic system of the hydraulic circuit 50 is controlled using the set target slip speed Ns* after the engine speed Ne exceeds the post-shifting input shaft speed Nin*. Thus, the engine speed Ne can be quickly raised to the post-shifting input shaft speed Nin*, and the time required for the slip speed Ns to be temporarily increased and then become the non-shifting-time target slip speed Nsst* or less (in the case where the non-shifting-time target slip speed Nsst* takes a value of 0, the time until the lock-up clutch 28 completes lock-up) can be reduced.

In the power transfer device 20 according to the embodiment, after the engine speed Ne exceeds the post-shifting input shaft speed Nin*, the target slip speed Ns* is set by limiting with the predetermined value Ns1 a value obtained by adding the larger one of the non-shifting-time target slip speed Nsst* and the predetermined value γ to the difference (Nin*−Nin) as indicated by the foregoing formula (1) before the input shaft speed Nin reaches the post-shifting input shaft speed Nin*, and the target slip speed Ns* is set so as to decrease at the target change rate ΔNs after the input shaft speed Nin reaches the post-shifting input shaft speed Nin*. However, the present invention is not limited thereto, and the target slip speed Ns* may be set using the formula (1) before the difference (Nin*−Nin) becomes a value (Nsst*+γ) or less, and may be set so as to decrease at the target change rate ΔNs after the difference (Nin*−Nin) becomes the value (Nsst*+γ) or less. The target slip speed Ns* may be set using the formula (1), or may be set so as to decrease at the target change rate ΔNs, irrespective of whether or not the input shaft speed Nin has reached the post-shifting input shaft speed Nin*.

In the power transfer device 20 according to the embodiment, after the engine speed Ne exceeds the post-shifting input shaft speed Nin* and before the input shaft speed Nin reaches the post-shifting input shaft speed Nin*, the target slip speed Ns* is set by limiting with the predetermined value Ns1 a value obtained by adding the larger one of the non-shifting-time target slip speed Nsst* and the predetermined value γ to the difference (Nin*−Nin) as indicated by the foregoing formula (1). However, the target slip speed Ns* may be set to the difference (Nin*−Nin). In this case, after the engine speed Ne exceeds the post-shifting input shaft speed Nin*, the target slip speed Ns* (=Nin*−Nin) becomes smaller compared to the slip speed Ns (=Ne−Nin) and the predetermined value Ns1, and thus the slip speed Ns is gradually reduced by adjusting the engagement force of the lock-up clutch 28 to an engagement force with which the slip speed Ns becomes the target slip speed Ns*.

In the power transfer device 20 according to the embodiment, the target change rate ΔNs is calculated by subtracting the non-shifting-time target slip speed Nsst* from the slip speed Ns, which is obtained by subtracting the input shaft speed Nin from the engine speed Ne, and dividing the obtained value by the predetermined value Δt as indicated by the foregoing formula (2) after the engine speed Ne exceeds the post-shifting input shaft speed Nin* and after the input shaft speed Nin reaches the post-shifting input shaft speed Nin*. However, the target change rate ΔNs may be calculated by subtracting the non-shifting-time target slip speed Nsst* from the target slip speed Ns* at the time immediately before the input shaft speed Nin reaches the post-shifting input shaft speed Nin* (immediately before the post-shifting input shaft speed Nin* becomes equal to the input shaft speed Nin in step S160) and dividing the obtained value by the predetermined value Δt.

In the power transfer device 20 according to the embodiment, after the engine speed Ne exceeds the post-shifting input shaft speed Nin* and before the input shaft speed Nin reaches the post-shifting input shaft speed Nin*, the non-shifting-time target slip speed Nsst* is set on the basis of the post-shifting input shaft speed Nin* and the output torque Te. However, the non-shifting-time target slip speed Nsst* may be set on the basis of the input shaft speed Nin and the output torque Te.

In the power transfer device 20 according to the embodiment, in a region where the input shaft speed Nin is not less than the predetermined value Ninref, the non-shifting-time target slip speed Nsst* is set to a value of 0. However, the present invention is not limited thereto, and the non-shifting-time target slip speed Nsst* may be set to a positive value (such as 10 rpm or 30 rpm, for example) that is sufficiently small compared to the predetermined value Ns1. Alternatively, the non-shifting-time target slip speed Nsst* may be set to a fixed value (such as 0 rpm, 30 rpm, or 50 rpm, for example) irrespective of the input shaft speed Nin.

In the power transfer device 20 according to the embodiment, the fluid transmission apparatus 22 may be a torque converter that includes the stator 25 which rectifies the flow of hydraulic oil from the turbine runner 24 to the pump impeller 23, that is, that functions as a torque amplifier when the lock-up clutch 28 releases lock-up. However, the fluid transmission apparatus 22 may instead be a so-called fluid coupling which does not have a function as a torque amplifier.

In the embodiment, the present invention is applied to the power transfer device 20. However, the present invention may be implemented as a lock-up device including the lock-up clutch 28 incorporated in the power transfer device 20, or as a power transfer device control method.

The correspondence between the main elements of the embodiment and the main elements of the invention described in the "SUMMARY OF THE INVENTION" section will be described. In the embodiment, the stepped automatic transmission 30 corresponds to the "stepped automatic transmission". The fluid transmission apparatus 22 which includes the pump impeller 23, the turbine runner 24, and the lock-up clutch 28 corresponds to the "fluid transmission apparatus". The lock-up clutch hydraulic system of the hydraulic circuit 50 corresponds to the "engagement force adjustment unit". The transmission ECU 80 which executes the kickdown-time target slip speed setting routine of FIG. 6, in which at the time of a kickdown when a downshift of the stepped automatic transmission 30 is to be performed in response to the driver depressing the accelerator pedal 93, the target slip speed Ns* is set to the predetermined value Ns1 and the set target slip speed Ns* is output before the engine speed Ne exceeds the post-shifting input shaft speed Nin* which is the rotational speed of the input shaft 31 after the downshift of the automatic transmission 30, and the target slip speed Ns* is set so as to decrease toward the non-shifting-time target slip speed Nsst* along with lapse of time after the engine speed Ne exceeds the post-shifting input shaft speed Nin*, corresponds to the "target slip speed setting unit". The transmission ECU 80 which controls the lock-up clutch hydraulic system of the hydraulic circuit 50 using the target slip speed Ns* such that the slip speed Ns (=Ne−Nin) becomes the target slip speed Ns* corresponds to the "control unit".

The correspondence between the main elements of the embodiment and the main elements of the invention described in the "SUMMARY OF THE INVENTION" section does not limit the elements of the invention described in the "SUMMARY OF THE INVENTION" section, because the embodiment is an example for the purpose of specifically describing the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While the embodiment of the present invention has been described above, it is a matter of course that the present invention is not limited to the embodiment in any way, and that the present invention may be implemented in various forms without departing from the scope and sprit of the present invention.

The present invention may be applied to the power transfer device manufacturing industry and so forth.

What is claimed is:

1. A power transfer device including a stepped automatic transmission mounted on a vehicle to transfer power from a power source to an axle using changeable shift speeds, comprising:
    a fluid transmission apparatus including an input-side fluid transmission element connected to the power source, an output-side fluid transmission element connected to an input shaft of the automatic transmission, and a lock-up clutch that engages and disengages the input-side fluid transmission element and the output-side fluid transmission element;
    an engagement force adjustment unit that adjusts an engagement force of the lock-up clutch;
    a target slip speed setting unit that sets, after a kickdown condition, that is, a downshift of the automatic transmission is to be performed in response to a predetermined request for a large drive force, is satisfied, a target slip speed to a predetermined value larger than a non-shifting-time value before a rotational speed of the power source exceeds a post-shifting input shaft speed which is a rotational speed of the input shaft after the downshift, and setting the target slip speed so as to decrease toward the non-shifting-time value along with lapse of time after the rotational speed of the power source exceeds the post-shifting input shaft speed, wherein the target slip speed is a target value of a slip speed which is a difference between the rotational speed of the power source and the rotational speed of the input shaft, and the non-shifting-time value is a value that is set when no shifting of the automatic transmission is performed; and
    a control unit that controls the engagement force adjustment unit such that the slip speed becomes the set target slip speed,
    wherein after the rotational speed of the power source exceeds the post-shifting input shaft speed, the target slip speed setting unit sets the target slip speed to a smaller one of the predetermined value and a value obtained by adding to the input shaft speed difference, the larger of a second predetermined value smaller than the predetermined value and a non-shifting-time target slip speed, wherein the input shaft speed difference is a difference between the rotational speed of the input shaft and the post-shifting input shaft speed, and
    the target slip speed setting unit sets the target slip speed so as to decrease at a predetermined change rate along with lapse of time after the rotational speed of the input shaft reaches the post-shifting input shaft speed.

2. The power transfer device according to claim 1, wherein the target slip speed setting unit uses a value of 0 as the non-shifting-time value after the downshift.

3. The power transfer device according to claim 1, wherein the target slip speed setting unit uses a value of 0 as the non-shifting-time value after the downshift.

4. A lock-up clutch device including a lock-up clutch mounted on a vehicle to engage and disengage an input-side fluid transmission element connected to a power source and an output-side fluid transmission element connected to an input shaft of a stepped automatic transmission, comprising:
    an engagement force adjustment unit that adjusts an engagement force of the lock-up clutch;
    a target slip speed setting unit that sets, when a downshift of the automatic transmission is to be performed in response to a predetermined request for a large drive force, a target slip speed to a predetermined value larger than a non-shifting-time value before a rotational speed of the power source exceeds a post-shifting input shaft speed which is a rotational speed of the input shaft after the downshift, and setting the target slip speed so as to decrease toward the non-shifting-time value along with lapse of time after the rotational speed of the power source exceeds the post-shifting input shaft speed, wherein the target slip speed is a target value of a slip speed which is a difference between the rotational speed of the power source and the rotational speed of the input shaft, and the non-shifting-time value is a value that is set when no shifting of the automatic transmission is performed; and
    a control unit that controls the engagement force adjustment unit such that the slip speed becomes the set target slip speed,
    wherein after the rotational speed of the power source exceeds the post-shifting input shaft speed, the target slip speed setting unit sets the target slip speed to a smaller one of the predetermined value and a value obtained by adding to the input shaft speed difference, the larger of a second predetermined value smaller than the predetermined value and a non-shifting-time target slip speed, wherein the input shaft speed difference is a difference between the rotational speed of the input shaft and the post-shifting input shaft speed, and the target slip speed setting unit sets the target slip speed so as to decrease at a predetermined change rate along with lapse of time after the rotational speed of the input shaft reaches the post-shifting input shaft speed.

5. A control method for a power transfer device including a stepped automatic transmission mounted on a vehicle to transfer power from a power source to an axle using changeable shift speeds, a fluid transmission apparatus including an input-side fluid transmission element connected to the power source, an output-side fluid transmission element connected to an input shaft of the automatic transmission, and a lock-up clutch that engages and disengages the input-side fluid transmission element and the output-side fluid transmission element, and an engagement force adjustment unit that adjusts an engagement force of the lock-up clutch, the method comprising:

setting, when a downshift of the automatic transmission is to be performed in response to a predetermined request for a large drive force, a target slip speed to a predetermined value larger than a non-shifting-time value, and controlling the engagement force adjustment unit such that the slip speed becomes the set target slip speed before a rotational speed of the power source exceeds a post-shifting input shaft speed which is a rotational speed of the input shaft after the downshift, wherein the target slip speed is a target value of a slip speed which is a difference between the rotational speed of the power source and the rotational speed of the input shaft, and the non-shifting-time value is a value that is set when no shifting of the automatic transmission is performed; and setting the target slip speed so as to decrease toward the non-shifting-time value along with lapse of time and controlling the engagement force adjustment unit such that the slip speed becomes the set target slip speed after the rotational speed of the power source exceeds the post-shifting input shaft speed, wherein after the rotational a speed of the power source exceeds the post-shifting input shaft speed, the target slip speed is set to a speed to a smaller one of the predetermined value and a value obtained by adding to the input shaft speed difference, the larger of a second predetermined value smaller than the predetermined value and a non-shifting-time target slip speed, wherein the input shaft speed difference is a difference between the rotational speed of the input shaft and the post-shifting input shaft speed, and the target slip speed is set so as to decrease at a predetermined change rate along with lapse of time after the rotational speed of the input shaft reaches the post-shifting input shaft speed.

* * * * *